US011651723B2

(12) United States Patent
Baek et al.

(10) Patent No.: US 11,651,723 B2
(45) Date of Patent: May 16, 2023

(54) DISPLAY DEVICE AND METHOD OF DRIVING THE SAME

(71) Applicant: Samsung Display Co., Ltd., Yongin-Si (KR)

(72) Inventors: Sung Yeol Baek, Yongin-si (KR); In Bok Song, Yongin-si (KR); Jong Gil Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/584,208

(22) Filed: Jan. 25, 2022

(65) Prior Publication Data

US 2022/0148472 A1  May 12, 2022

Related U.S. Application Data

(63) Continuation of application No. 17/105,607, filed on Nov. 26, 2020, now Pat. No. 11,270,626.

(30) Foreign Application Priority Data

Mar. 11, 2020  (KR) .......................... 10-2020-0030278

(51) Int. Cl.
*G09G 3/20* (2006.01)
*G06F 3/14* (2006.01)
*G09G 3/00* (2006.01)

(52) U.S. Cl.
CPC .......... *G09G 3/2092* (2013.01); *G06F 3/1431* (2013.01); *G09G 3/007* (2013.01); *G09G 2310/0275* (2013.01); *G09G 2360/12* (2013.01); *G09G 2370/08* (2013.01)

(58) Field of Classification Search
CPC ...................................................... G06F 3/1431
See application file for complete search history.

(56) References Cited

U.S. PATENT DOCUMENTS

| 9,165,518 | B2 | 10/2015 | Choi et al. |
|---|---|---|---|
| 10,325,549 | B2 | 6/2019 | Moon |
| 2010/0265228 | A1 | 10/2010 | Kimura et al. |
| 2016/0078587 | A1 | 3/2016 | Lee et al. |
| 2018/0088892 | A1 | 3/2018 | Park |

FOREIGN PATENT DOCUMENTS

| KR | 10-1630336 B1 | 6/2016 |
|---|---|---|
| KR | 10-1954934 B1 | 3/2019 |
| KR | 10-2019-0080292 A | 7/2019 |

*Primary Examiner* — Gustavo Polo
(74) *Attorney, Agent, or Firm* — Innovation Counsel LLP

(57) ABSTRACT

A display device includes a display driver configured to generate a data signal based on input image data, and a display panel configured to display an image in a display area based on the data signal. The input image data includes position information of the image, the display driver updates at least a portion of the position information included in the input image data corresponding to at least a partial area of the display area and provides the data signal including an updated position information during a frame period in which no new input image data is received, and the image corresponding to the partial area is updated in the display area based on the updated position information during the frame period.

20 Claims, 15 Drawing Sheets

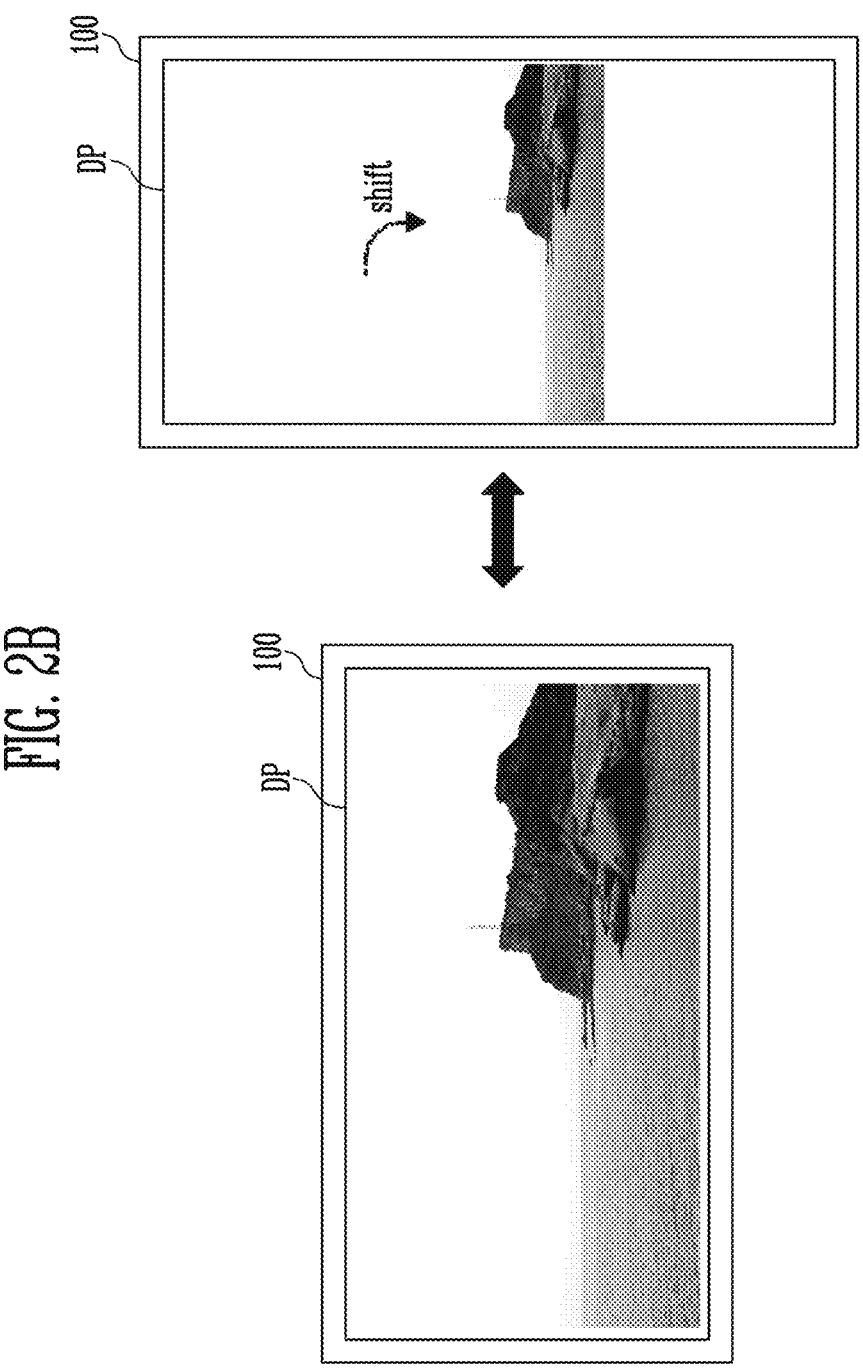

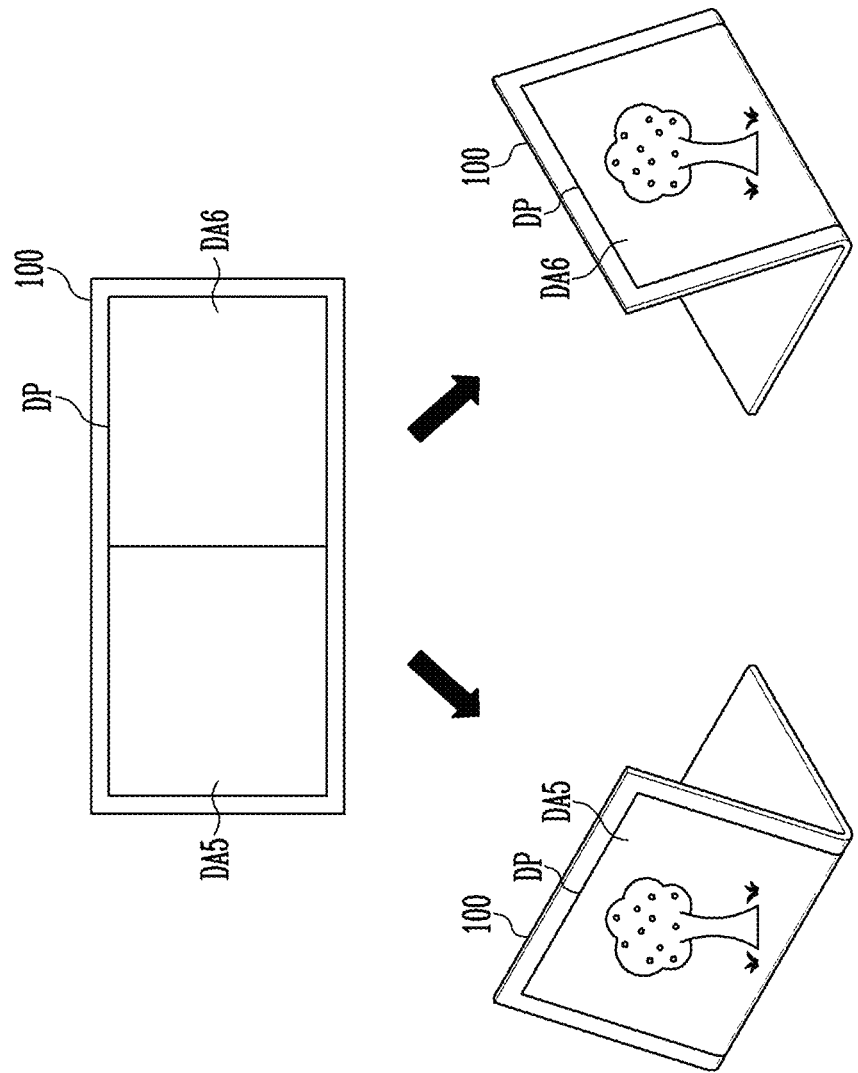

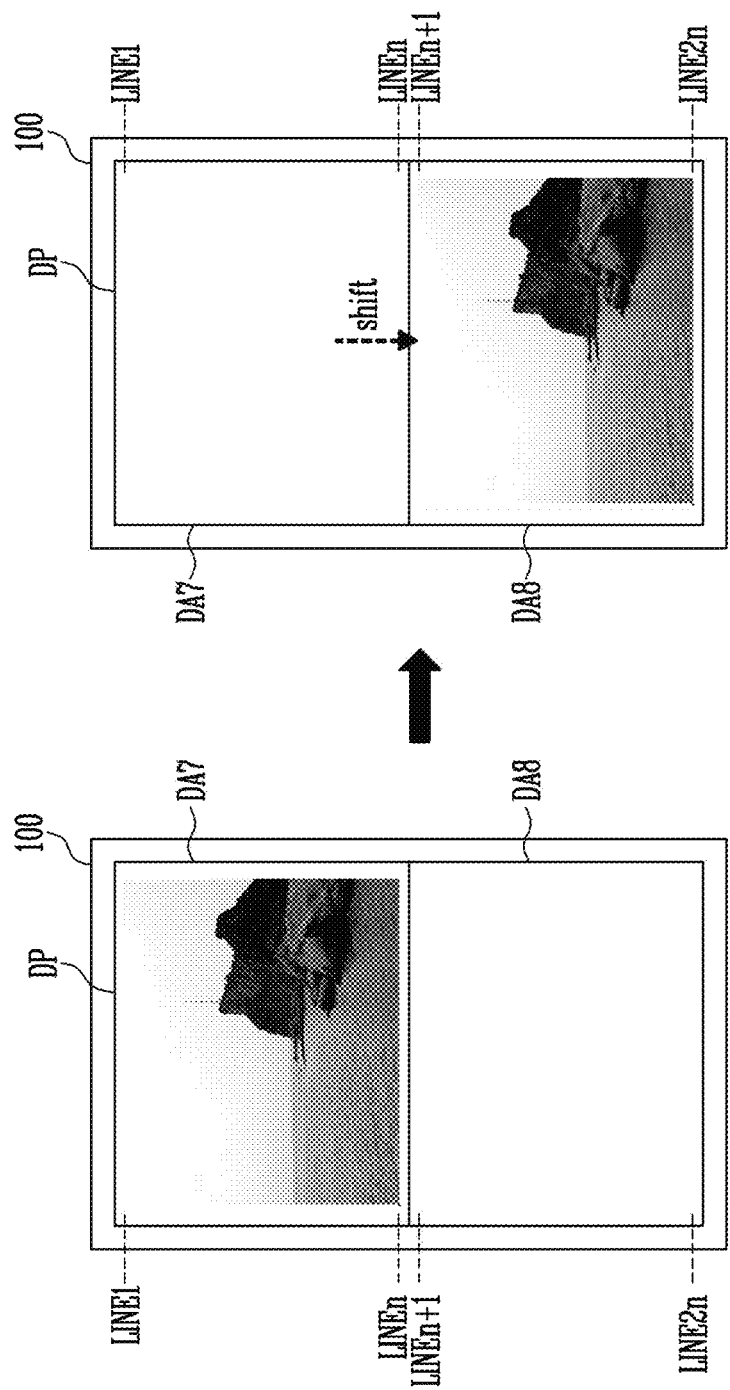

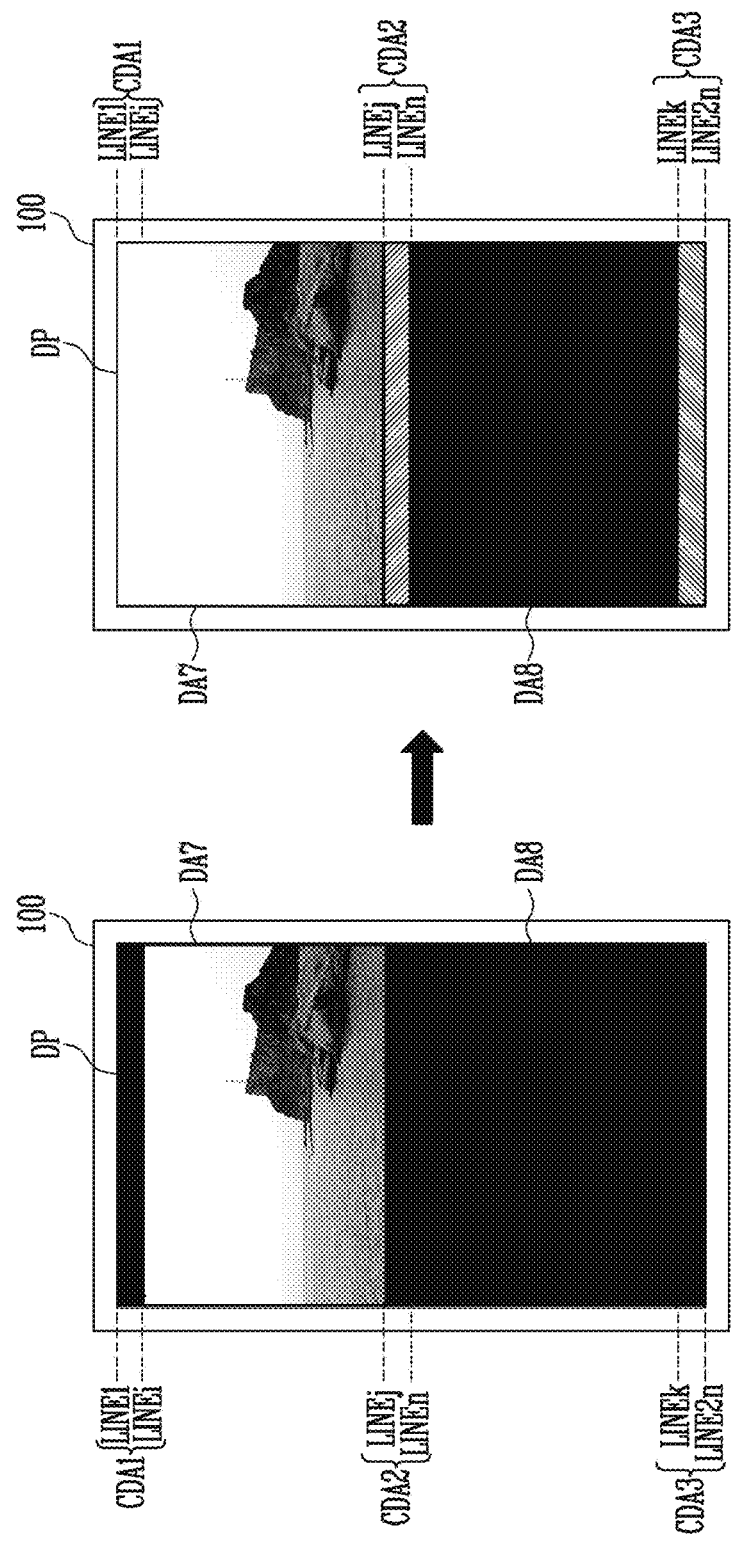

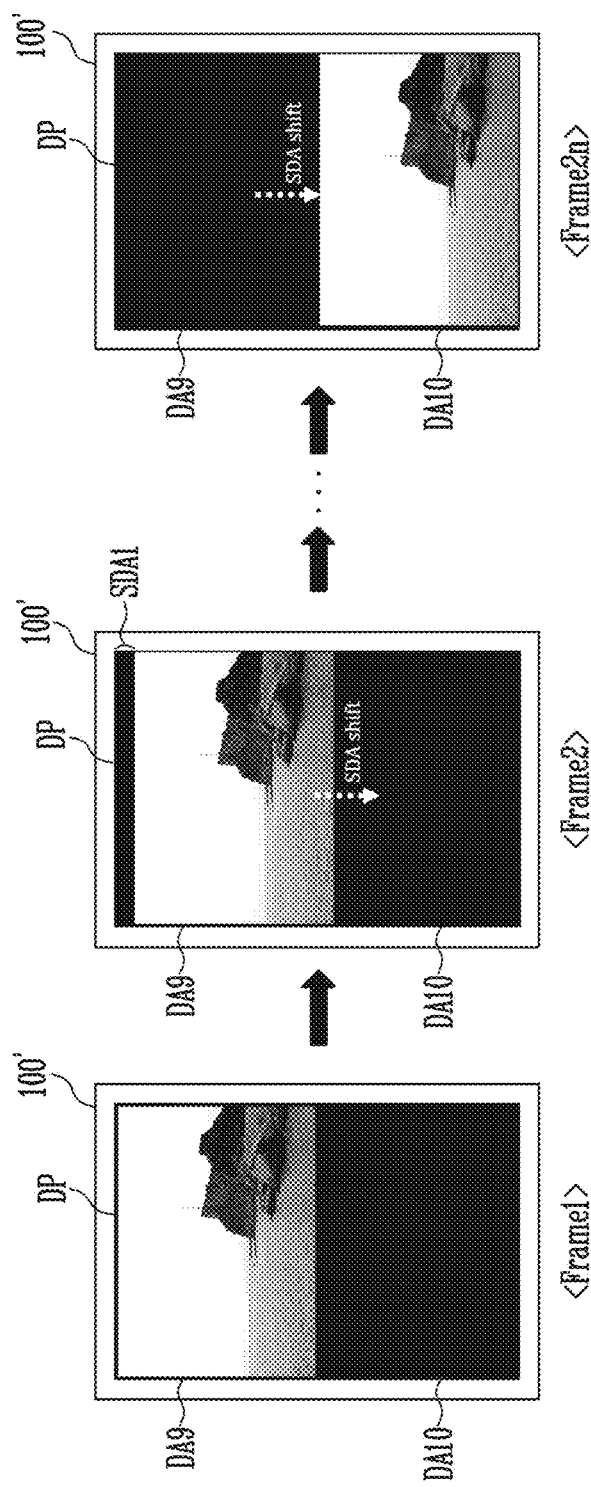

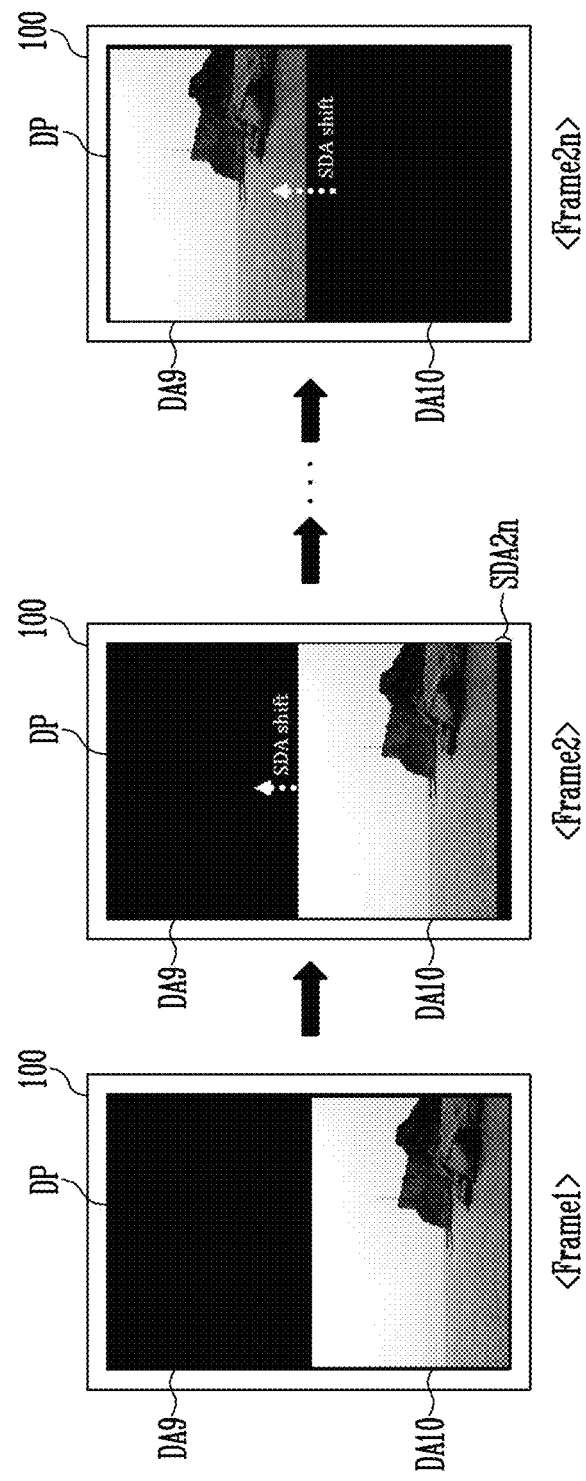

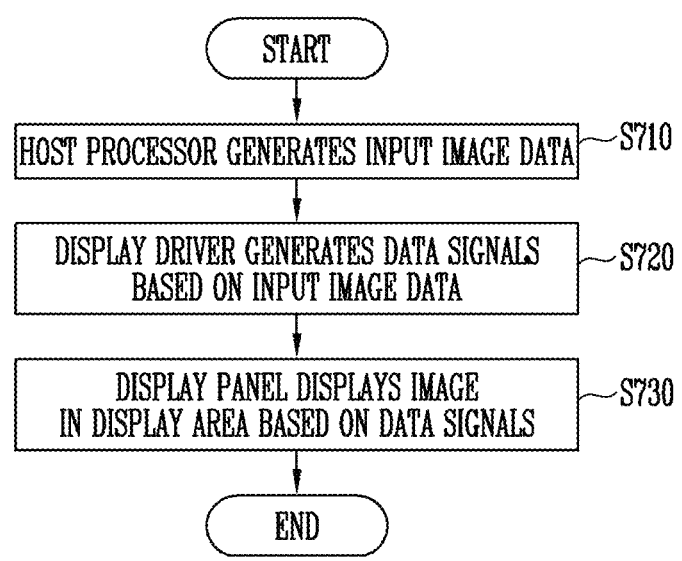

DISPLAY DEVICE AND METHOD OF DRIVING THE SAME

CROSS-REFERENCE TO RELATED APPLICATIONS

The present application is a continuation application of U.S. patent application Ser. No. 17/105,607 filed on Nov. 26, 2020, which claims priority to Korean Patent Application No. 10-2020-0030278 filed on Mar. 11, 2020; the prior applications are incorporated by reference.

BACKGROUND

1. Technical Field

Various embodiments of the present disclosure relate to a display device and a method of driving the display device.

2. Related Art

A display device may include a host processor, a display driver, and a display panel. The host processor may transmit input image data to the display driver, and the display driver may generate data signals based on the input image data. The display panel may display an image in a display area based on the data signals.

The display device may shift an image displayed in the display area of the display panel depending on a display mode. When the host processor generates input image data for shifting the image in each frame and transmits the generated input image data to the display driver, power consumption by the display device may increase.

SUMMARY

Various embodiments of the present disclosure are directed to a display device that is capable of reducing power consumption by a host processor for generating input image data and power consumption by an interface for transmitting/receiving the input image data.

An embodiment of the present disclosure may provide for a display device. The display device may include a display driver configured to receive input image data and generate a data signal based on the input image data, and a display panel configured to display an image in a display area based on the data signal. The input image data may include position information of the image, and the display driver may update at least a portion of the position information included in the input image data corresponding to at least a partial area of the display area and provide the data signal including an updated position information during a frame period in which no new input image data is received. The image corresponding to the partial area may be updated in the display area based on the updated position information during the frame period.

In an embodiment, the display panel may be drivable in a first mode in which a moving image is displayed in the display area or a second mode in which a still image is displayed in the display area.

In an embodiment, the input image data may include first sub-input image data and second sub-input image data; in the first mode, the first sub-input image data may be provided to the display driver in each frame; and in the second mode, the second sub-input image data may be provided to the display driver to correspond to at least one frame, after which provision of the second sub-input image data is paused.

In an embodiment, the display driver may include an input interface configured to receive the input image data, a frame memory configured to store the input image data, and an image position change component configured to change the position information included in the input image data stored in the frame memory.

In an embodiment, the display driver may further include a data signal generator configured to generate the data signal in each frame based on the input image data stored in the frame memory.

In an embodiment, the display area may include first to n-th sub-display areas, where n is a natural number, the input image data includes first to n-th line data values respectively corresponding to the first to n-th sub-display areas. The display driver may further include a line memory configured to store at least a portion of the first to n-th line data values included in the input image data stored in the frame memory.

In an embodiment, the line memory may store an i-th line data value and (i+1)-th line data value, among the first to n-th line data values, where i is a natural number that is equal to or greater than 1 and is less than or equal to n, the frame memory may store the i-th line data value stored in the line memory, as a first line data value corresponding to an (i+1)-th sub-display area, among the first to n-th sub-display areas, and stores the (i+1)-th line data value stored in the line memory, as a second line data value corresponding to an (i+2)-th sub-display area, among the first to n-th sub-display areas, and the image may be shifted based on the first to n-th line data values stored in the frame memory during the frame period.

An embodiment of the present disclosure may provide for a display device. The display device may include a host processor configured to generate input image data, a display driver configured to receive the input image data from the host processor and generate a data signal based on the input image data, and a display panel configured to display an image in a display area based on the data signal. The host processor may output the input image data and an image position control signal. The input image data may include position information of the image, and the display driver may update at least a portion of the position information included in the input image data in response to the image position control signal and provide the data signal including an updated position information during a frame period until the host processor outputs next input image data, the portion of the position information updated by the display driver corresponding to at least a partial area of the display area. The image corresponding to the partial area may be updated in the display area based on the updated position information during the frame period.

In an embodiment, the display panel may be drivable in a first mode in which a moving image is displayed in the display area or a second mode in which a still image is displayed in the display area, and the input image data may include first sub-input image data corresponding to the first mode and second sub-input image data corresponding to the second mode.

In an embodiment, the host processor may include an image position control signal generator configured to generate the image position control signal in the second mode, and an output interface configured to output the first sub-input image data, the second sub-input image data, and the image position control signal.

In an embodiment, the host processor may further include an image analyzer configured to analyze whether the display mode is the first mode or the second mode, and an output controller configured to generate an output control signal when the display mode is the second mode based on a result of analysis by the image analyzer.

In an embodiment, the output interface may be configured to, in the first mode, output the first sub-input image data as the input image data in each frame, and in the second mode, output the second sub-input image data corresponding to at least one frame as the input image data in response to the output control signal, and pause to output the input image data based on the result of analysis.

In an embodiment, the display driver may include an input interface configured to receive the first sub-input image data, the second sub-input image data, and the image position control signal, a frame memory configured to store the second sub-input image data in the second mode, and an image position change component configured to generate an image position change signal in response to the image position control signal in the second mode. The portion of the position information included in the second sub-input image data stored in the frame memory may be updated in response to the image position change signal in the second mode.

In an embodiment, the display driver may further include a data signal generator configured to generate the data signal in each frame based on the input image data.

In an embodiment, the data signal generator may be configured to, in the first mode, generate the data signal based on the first sub-input image data, and in the second mode, generate the data signal based on the second sub-input image data stored in the frame memory.

In an embodiment, the display panel may include a visible area that is perceivable by a user and an invisible area that is not perceivable by the user in the display area, and the host processor may generate the image position control signal based on the visible area.

In an embodiment, the host processor may generate the image position control signal based on scroll information.

In an embodiment, the display area may include first to n-th sub-display areas, where n is a natural number, the second sub-input image data may include first to n-th line data values respectively corresponding to the first to n-th sub-display areas. The display driver may further include a line memory configured to store at least a portion of the first to n-th line data values included in the second sub-input image data stored in the frame memory.

In an embodiment, the line memory may store an i-th line data value and (i+1)-th line data value, among the first to n-th line data values, in response to the image position change signal in the second mode, where i is a natural number that is equal to or greater than 1 and is less than or equal to n. The frame memory may store the i-th line data value stored in the line memory, as a first line data value corresponding to an (i+1)-th sub-display area, among the first to n-th sub-display areas, and store the (i+1)-th line data value stored in the line memory, as a second line data value corresponding to an (i+2)-th sub-display area, among the first to n-th sub-display areas, in response to the image position change signal in the second mode. The image may be shifted based on the first to n-th line data values stored in the frame memory in the second mode.

An embodiment of the present disclosure may provide for a method of driving a display device that includes a host processor, a display driver, and a display panel. The method may include generating, by the host processor, input image data, generating, by the display driver, a data signal based on the input image data, and displaying, by the display panel, an image in a display area based on the data signal. The display panel may be drivable in a first mode or a second mode depending on a display mode, the host processor may output first sub-input image data as the input image data in the first mode, output second sub-input image data as the input image data and an image position control signal in the second mode. The second sub-input image data may include position information of an image displayed in the display area. The display driver may update at least a portion of the position information included in the second sub-input image data in response to the image position control signal and provide the data signal including an updated position information in the second mode, the portion of the position information updated by the display driver corresponding to at least a partial area of the display area. The host processor may pause outputting the input image data in the second mode. The image corresponding to the partial area is updated in the display area based on the updated position information in the second mode until the host processor outputs next input image data.

In an embodiment, the display panel may be configured to display a moving image in the display area in the first mode, and display a still image in the display area in the second mode.

In an embodiment, the display driver may include a frame memory and an image position change component, and the frame memory may store the second sub-input image data in the second mode. The image position change component may generate an image position change signal in response to the image position control signal in the second mode. The portion of the position information included in the second sub-input image data stored in the frame memory may be updated in response to the image position change signal in the second mode.

In an embodiment, the display driver may further include a data signal generator. The data signal generator may generate the data signal in each frame based on the input image data.

In an embodiment, the data signal generator may be configured to, in the first mode, generate the data signal based on the first sub-input image data, and in the second mode, generate the data signal based on the second sub-input image data stored in the frame memory.

In an embodiment, the display panel may include a visible area that is perceivable by a user and an invisible area that is not perceivable by the user in the display area. The host processor may generate the image position control signal based on the visible area.

In an embodiment, the display area may include first to n-th sub-display areas, where n is a natural number. The second sub-input image data may include first to n-th line data values respectively corresponding to the first to n-th sub-display areas.

In an embodiment, the display driver may further include a line memory, the line memory stores an i-th line data value and (i+1)-th line data value, among the first to n-th line data values, in response to the image position change signal in the second mode, where i is a natural number that is equal to or greater than 1 and is less than or equal to n. The frame memory may store the i-th line data value stored in the line memory, as a first line data value corresponding to an (i+1)-th sub-display area, among the first to n-th sub-display areas, and store the (i+1)-th line data value stored in the line memory, as a second line data value corresponding to an (i+2)-th sub-display area, among the first to n-th sub-display areas, in response to the image position change signal in the second mode. The image may be shifted based on the first to n-th line data values stored in the frame memory in the second mode.

BRIEF DESCRIPTION OF THE DRAWINGS

FIG. 2A, FIG. 2B, FIG. 2C, FIG. 2D, FIG. 2E, and FIG. 2F illustrate examples in which an image displayed in a display area of a display panel included in the display device of FIG. 1 is shifted.

FIG. 5B is a diagram illustrating an example in which an image displayed in the display area of the display panel of FIG. 4B is shifted according to the operation of the display device described with reference to FIG. 5A.

FIG. 6B is a diagram illustrating an example in which an image displayed in the display area of the display panel of FIG. 4B is shifted according to the operation of the display device described with reference to FIG. 6A.

FIG. 7 is a flowchart of driving a display device according to an embodiment of the present disclosure.

DETAILED DESCRIPTION

Figure 1:
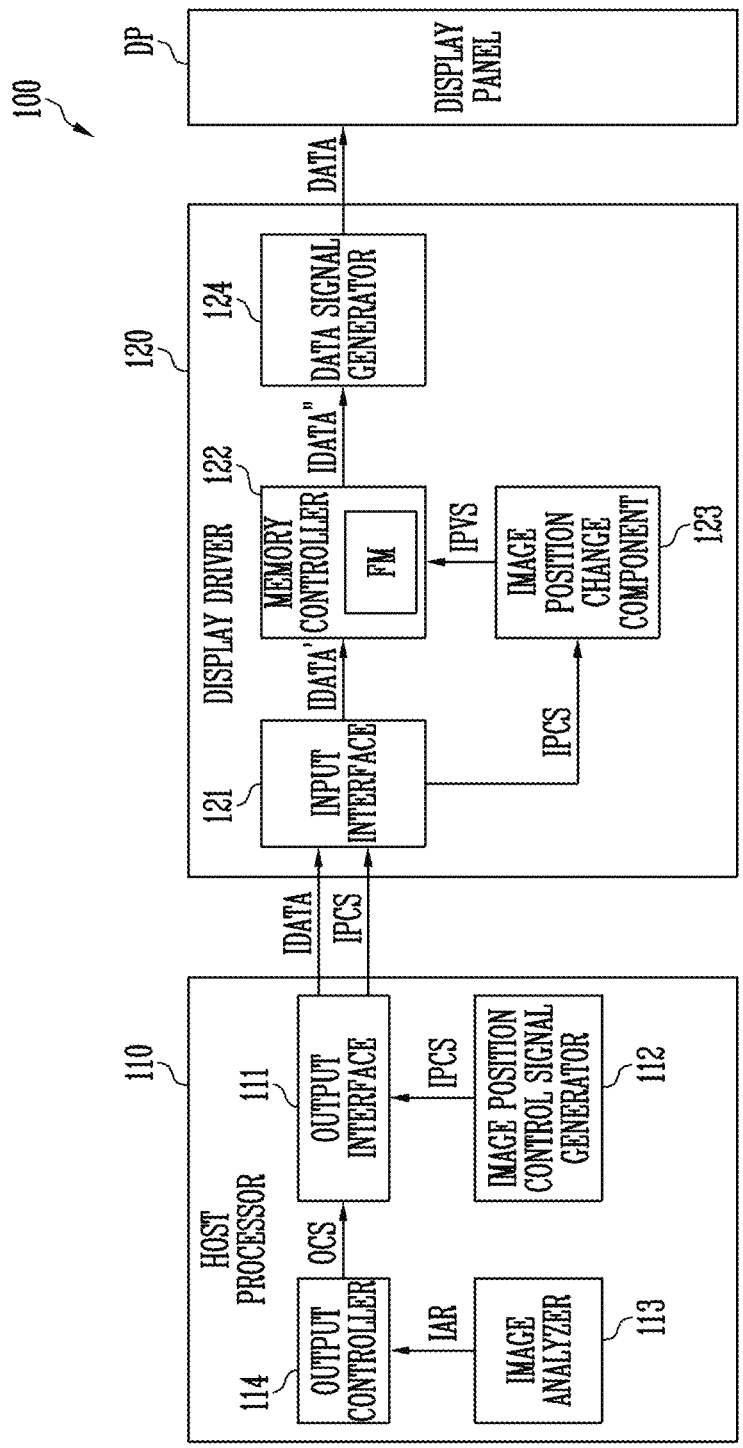
FIG. 1 is a diagram of a display device according to an embodiment of the present disclosure.

Examples of various embodiments of the present disclosure are illustrated in the accompanying drawings and described below. The embodiments of the present disclosure may be variously modified in many different forms without departing from the spirit and technical scope of the present disclosure. The embodiments described herein are not intended to limit the present disclosure to particular modes of practice, and it is instead to be appreciated that changes, equivalents, and substitutes are encompassed in the present disclosure.

Throughout the present disclosure, the same reference numerals are used to designate the same or similar elements. The sizes of elements in the accompanying drawings may be exaggerated for clarity of illustration. It will be understood that, although the terms "first" and "second" may be used herein to describe various elements, these elements should not be limited by these terms. These terms are only used to distinguish one element from another element. For instance, a first element discussed below may be termed a second element without departing from the teachings of the present disclosure. Similarly, the second element may also be termed the first element. In the present disclosure, a singular form is intended to include a plural form as well, unless the context clearly indicates otherwise.

It should be further understood that the terms "comprise," "include," and "have," when used in the present disclosure, specify the presence of stated features, integers, steps, operations, elements, components, and/or any combination thereof, but do not preclude the presence or addition of one or more other features, integers, steps, operations, elements, components, and/or combinations thereof.

Hereinafter, embodiments of the present disclosure will be described with reference to the attached drawings.

FIG. 1 is a diagram of a display device according to an embodiment of the present disclosure.

Referring to FIG. 1, a display device 100 may include a display panel DP, a host processor 110, and a display driver 120. Although it is not shown in FIG. 1, the display device 100 may further include a power management device, a communication device, a camera, a sensor, etc. In some embodiments, the host processor 110 may be included in a host computer (not shown) and may interface with the display driver 120 of the display device 100.

In an embodiment, the display device 100 may be implemented as a device that is capable of utilizing or supporting a mobile industry processor interface (MIPI), for example, a mobile device including, but not limited to, a mobile phone, a personal digital assistant (PDA), a portable multimedia player (PMP), a smartphone, and a wearable device.

The display panel DP may display an image in a display area based on data signals DATA.

The display panel DP may be driven in a normal mode or a power consumption reduction mode according to a display mode. In the normal mode, the display device 100 may generate input image data IDATA in each frame, and may display an image corresponding to each frame on the display panel DP based on the input image data IDATA. In the power consumption reduction mode, the display device 100 may generate the input image data IDATA corresponding to at least one frame, and may display an image for a plurality of frames using the input image data IDATA corresponding to the at least one frame. For the convenience of description, details of driving the display panel DP according to the power consumption reduction mode will be described below based on the assumption that the display mode of the display panel DP is the power consumption reduction mode unless the context explicitly indicates otherwise.

In an embodiment, the display panel DP may be driven in a moving image (video) mode (or a first mode) or a still image mode (or a second mode) depending on the display mode. Based on the data signals DATA, the display panel DP may display a moving image in the display area in a moving image mode and may display a still image in the display area in the still image mode.

The display panel DP may include scan lines, data lines, and pixels coupled to the scan lines and the data lines. In an embodiment, the display panel DP may be an organic light-emitting diode (OLED) display panel including an OLED. However, the display panel DP according to an embodiment of the present disclosure is not limited thereto, and may be of another type of display panel, for example, a liquid crystal display (LCD) panel, a plasma display panel (PDP), or the like.

The host processor 110 may control the operation of the display device 100. For example, the host processor 110 may be implemented as a system on chip, or as an application processor (AP) provided in the display device 100.

The host processor 110 may generate the input image data IDATA, and may output the input image data IDATA.

In an embodiment, when the display device 100 displays a moving image in the moving image mode, the host processor 110 may output the input image data IDATA (or first sub-input image data) in each frame in the moving image mode. Also, when the display device 100 displays a still image in the still image mode, the host processor 110 may output the input image data IDATA (or second sub-input image data) corresponding to at least one frame in the still image mode, and may not output the input image data IDATA for the duration of the still image mode.

For example, the host processor 110 may output the input image data IDATA corresponding to a still image at or after a time at which the display mode changes from the moving image mode to the still image mode, and may not output the input image data IDATA for the duration of the still image mode.

In addition to the input image data IDATA, the host processor 110 may generate and output an image position control signal IPCS.

In an embodiment, the input image data IDATA (or the second sub-input image data) generated by the host processor 110 in the still image mode may include position information of the image displayed in the display area of the display panel DP. Here, the position information included in the input image data IDATA may correspond to a position (or an area) of the image corresponding to the input image data IDATA displayed in the display area of the display panel DP. The image position control signal IPCS is used to shift the image from the position associated with the position information included in the input image data IDATA when the image is displayed in the display area of the display panel DP in the still image mode. In some embodiments, the image position control signal IPCS may be used to shift, rotate, and/or scale the image when the image is displayed in the display area of the display panel DP in the still image mode. In this regard, it is understood that the position information of the image referred herein may include not only the position information but also the rotation information and scale information of the image.

In an embodiment, the host processor 110 may further generate a vertical synchronization signal, a horizontal synchronization signal, a clock signal, a data enable signal, etc.

The host processor 110 may include an output interface 111, an image position control signal generator 112, an image analyzer 113, and an output controller 114.

The output interface 111 (or an output circuit) may provide the display driver 120 with the input image data IDATA generated in the moving image mode and/or the still image mode and the image position control signal IPCS. For example, the output interface 111 may output the input image data IDATA as serialized data signals.

In an embodiment, the output interface 111 may further output the vertical synchronization signal, the horizontal synchronization signal, the clock signal, the data enable signal, etc., that are generated by the host processor 110.

The image position control signal generator 112 may generate the image position control signal IPCS.

In an embodiment, the image position control signal generator 112 may generate the image position control signal IPCS to update position information included in the input image data IDATA in the still image mode.

In an embodiment, the image position control signal generator 112 may generate the image position control signal IPCS at regular periods (e.g., in each frame) in the still image mode, or may generate the image position control signal IPCS only when the image displayed in the display area of the display panel DP is shifted in the still image mode. The detailed operation of the image position control signal generator 112 will be described in detail later with reference to FIGS. 2A to 2F.

The image analyzer 113 may analyze the display mode of the display panel DP and determine whether the display mode is the moving image mode (or the first mode) or the still image mode (or the second mode). Here, the display device 100 may display a moving image in the display area of the display panel DP in the moving image mode, and may display a still image in the display area of the display panel DP in the still image mode.

In an embodiment, the image analyzer 113 may compare images in a frame, determine that the display mode is the still image mode when a change between the images in a plurality of consecutive frames is less than a preset threshold value, and determine that the display mode is the moving image mode when the change between the images in the plurality of consecutive frames is equal to or greater than the preset threshold value.

The output controller 114 may generate an output control signal OCS for controlling the output interface 111 to output the input image data IDATA based on an analysis result IAR that is received from the image analyzer 113.

In an embodiment, when the image analyzer 113 determines that the display mode is the still image mode, the output controller 114 may generate the output control signal OCS based on the analysis result IAR. When the image analyzer 113 determines that the display mode is the moving image mode, the output controller 114 may not generate the output control signal OCS based on the analysis result IAR.

In the still image mode, the output interface 111 may output input image data IDATA corresponding to at least one frame based on the output control signal OCS of the output controller 114, and may not output the input image data IDATA for the duration of the still image mode.

In the moving image mode, the output controller 114 may control the output of the host processor 110 (or the output interface 111) so that the host processor 110 (or the output interface 111) generates the input image data IDATA (or the first sub-input image data) corresponding to the moving image displayed in the display area in each frame based on the analysis results IAR.

Also, in the still image mode, the output controller 114 may generate the output control signal OCS based on the analysis result IAR. The host processor 110 (or the output interface 111) may output the input image data IDATA corresponding to at least one frame in the still image mode based on the output control signal OCS, and may not output the input image data IDATA for the duration of the still image mode.

For example, when the display mode changes from the moving image mode to the still image mode, the host processor 110 generates input image data IDATA corresponding to a still image, and the output interface 111 outputs the input image data IDATA in a first frame in the still image mode. During an interval from a second frame in the still image mode to the termination of the still image mode (i.e., until the display mode changes from the still image mode back to the moving image mode), the host processor 110 may not generate the input image data IDATA, and the output interface 111 may not output input image data IDATA.

The display driver 120 may receive the input image data IDATA from the host processor 110 (or the output interface 111), and may generate the data signals DATA based on the input image data IDATA.

In an embodiment, the display driver 120 may receive the image position control signal IPCS that is output from the host processor 110 in the still image mode, and may update the position information included in the input image data IDATA (or the second sub-input image data) in response to the image position control signal IPCS. Accordingly, the image displayed in the display area of the display panel DP may be shifted, rotated, and/or scaled in the still image mode.

The display driver 120 may drive the display panel DP by providing the data signals DATA, scan signals, etc. to the data lines and the scan lines of the display panel DP. In an embodiment, the display driver 120 may include, but is not limited to, a data driver that provides the data signals DATA to the display panel DP, a scan driver that provides the scan signals to the display panel DP, and a timing controller that controls the operating timing of the data driver and the scan driver. Further, in an embodiment, the display driver 120 may be implemented as a single integrated circuit (IC). For example, the display driver 120 may be implemented as a timing controller-embedded driver (TED) IC including the timing controller.

The display driver 120 may include an input interface 121, a memory controller 122, an image position change component 123, and a data signal generator 124.

The input interface 121 (or an input circuit) may receive the input image data IDATA in the moving image mode and the still image mode and the image position control signal IPCS that are output from the output interface 111.

In an embodiment, the output interface 111 included in the host processor 110 and the input interface 121 included in the display driver 120 may support MIPI interfaces conforming to the MIPI alliance specification including MIPI D-PHY. However, such interfaces are merely exemplary, and the communication interface between the host processor 110 and the display driver 120 is not limited thereto. For example, the output interface 111 and the input interface 121 may be compatible with a serial high-speed interface that supports a high-definition image of n-High Definition (nHD) or higher.

In an embodiment, the input interface 121 may convert the input image data IDATA that may be received as serialized data from the output interface 111 into deserialized input image data IDATA'.

The input interface 121 may provide the deserialized input image data IDATA' to the memory controller 122, and may provide the image position control signal IPCS to the image position change component 123.

In an embodiment, in the still image mode, the output interface 111 may not output the input image data IDATA, and thus the input interface 121 may not receive the input image data IDATA.

In an embodiment, the input interface 121 may further receive the vertical synchronization signal, the horizontal synchronization signal, the clock signal, the data enable signal, etc., that are output from the output interface 111.

The memory controller 122 may include a frame memory FM.

The frame memory FM may store the deserialized input image data IDATA' in the still image mode. The frame memory FM may further store image information of the image that is displayed in the display area of the display panel DP in accordance with the deserialized input image data IDATA', and the position information of the image in the still image mode.

In an embodiment, the frame memory FM may store the deserialized input image data IDATA' (or the first sub-input image data) corresponding to a moving image in the moving image mode, may store the deserialized input image data IDATA' (or the second sub-input image data) corresponding to at least one frame in the still image mode, and may maintain the deserialized input image data IDATA' for the duration of the still image mode.

In an embodiment, the memory controller 122 may further include an encoder and a decoder (not shown). The memory controller 122 may encode the deserialized input image data IDATA' received from the input interface 121 to compress the deserialized input image data IDATA' using the encoder, and the frame memory FM may store the deserialized input image data IDATA' as encoded data. Accordingly, the size of the memory space in the frame memory FM for storing the deserialized input image data IDATA' may be reduced. Further, the memory controller 122 may decompress (decode) the deserialized input image data IDATA' stored in the frame memory FM using the decoder, and may provide decoded input image data IDATA" to the data signal generator 124.

In an embodiment, the input interface 121 may provide the deserialized input image data IDATA' to the data signal generator 124 without passing through the memory controller 122 in the moving image mode. In this case, the frame memory FM may not store the deserialized input image data IDATA' in the moving image mode. However, this operation is not limited thereto, and the input interface 121 may provide the deserialized input image data IDATA' to the memory controller 122 in the moving image mode, and the frame memory FM may store the deserialized input image data IDATA' in the moving image mode and provide the decoded input image data IDATA" to the data signal generator 124.

The image position change component 123 may generate an image position change signal IPVS for updating the position information in associated with the deserialized input image data IDATA' stored in the frame memory FM, in response to the image position control signal IPCS in the still image mode.

In response to the image position change signal IPVS, the memory controller 122 may update the position information in the deserialized input image data IDATA' (or the second sub-input image data) stored in the frame memory FM.

In an embodiment, the memory controller 122 may change information regarding a start line and an end line of the image displayed in the display area of the display panel DP in response to the image position change signal IPVS in the still image mode, and may update the position information included in the deserialized input image data IDATA' stored in the frame memory FM. Here, the information regarding the start line and the end line may correspond to data lines and/or scan lines. Detailed description of this operation will be described later with reference to FIG. 2E.

In an embodiment, when a portion of the image corresponding to a partial area of the display area of the display panel DP are changed, the host processor 110 may output both the input image data IDATA (or third sub-input image data) corresponding to the partial area and the image position control signal IPCS including the position information of the input image data IDATA corresponding to the partial area, to the display driver 120. The display driver 120 may update a portion of the deserialized input image data IDATA' corresponding to the partial area based on the input image data IDATA corresponding to the partial area and the image position control signal IPCS. Detailed description of this operation will be described later with reference to FIG. 2F.

The data signal generator 124 may generate the data signals DATA based on the decoded input image data IDATA" received from the frame memory FM in each frame.

Meanwhile, when the input interface 121 provides the deserialized input image data IDATA' to the data signal generator 124 without passing through the memory controller 122 in the moving image mode, the data signal generator 124 may generate the data signals DATA based on the deserialized input image data IDATA' received from the input interface 121 in the moving image mode.

In an embodiment, the data signal generator 124 may generate the data signals DATA in response to a data enable signal.

Accordingly, the data signal generator 124 may generate the data signals DATA (or first sub-data signals), based on the decoded input image data IDATA" stored in the frame memory FM (or the deserialized input image data IDATA' received from the input interface 121) in each frame in the moving image mode, and the display panel DP may display a moving image in the display area based on the data signals DATA.

Further, the data signal generator 124 may generate the data signals DATA (or second sub-data signals) based on the decoded input image data IDATA" stored in the frame memory FM in each frame in the still image mode, and the display panel DP may display a still image in the display area based on the data signals DATA. Here, when the position information of the decoded input image data IDATA" stored in the frame memory FM is updated in response to the image position change signal IPVS, the image displayed in the display area of the display panel DP may be shifted, rotated, and/or scaled.

As described above with reference to FIG. 1, when it is determined that the display mode is the still image mode based on the analysis result IAR that is output from the image analyzer 113, the output controller 114 may control the output operation of the host processor 110 so that input image data IDATA is not generated in the still image mode, and may further control the output interface 111 so that the input image data IDATA is not output in the still image mode. Here, although the host processor 110 does not generate the input image data IDATA, the output interface 111 does not output input image data IDATA, and the input interface 121 does not receive input image data IDATA in each frame in the still image mode, the display device 100 may still update the position information included in the deserialized input image data IDATA' that is stored in the frame memory FM in response to the image position change signal IPVS (or the image position control signal IPCS), thus the image may be still displayed in the display area as being shifted, rotated, and/or scaled in the still image mode. Accordingly, power consumption by the host processor 110 to generate the input image data IDATA, and power consumption by the output interface 111 and the input interface 121 to transmit/receive the input image data IDATA may be reduced in the still image mode.

FIGS. 2A to 2F illustrates examples in which an image displayed in the display area of the display panel DP is changed in the still image mode.

As described above with reference to FIG. 1, in an embodiment, the image position control signal generator 112 may generate the image position control signal IPCS at a regular time interval (e.g., in each frame) in the still image mode.

Figure 2A:
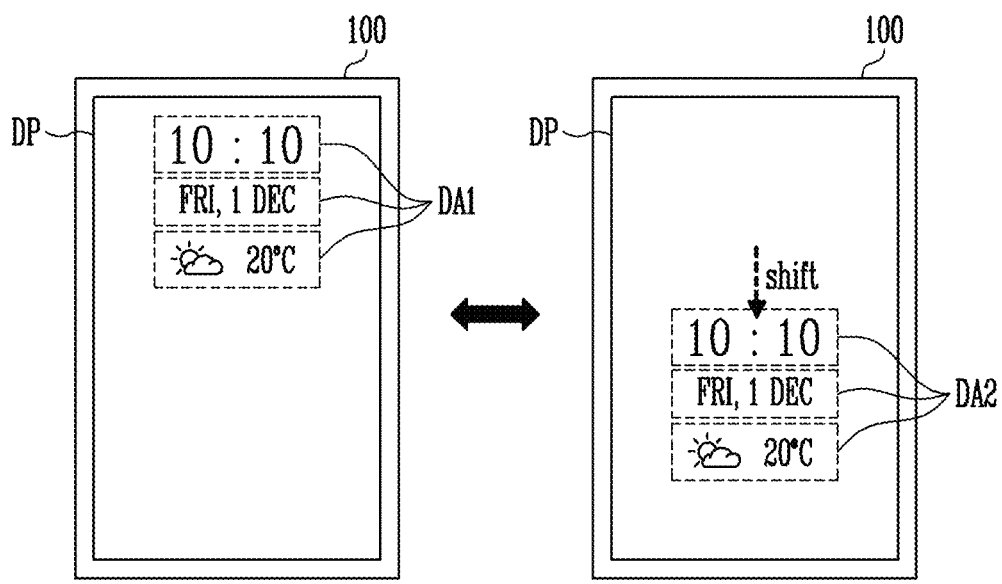

Referring to FIGS. 1 and 2A, when the display device 100 is driven in an always-on display mode (AOD) mode, the display device 100 may display a time image, a weather image, etc. on the display panel DP. Here, when a time image, a weather image, etc. are continuously displayed in a specific area (e.g., a first display area DA1) within the display area of the display panel DP, the degradation of the display panel DP in the specific area may accelerate compared to other areas within the display area. Therefore, to prevent accelerated degradation, the display device 100 may periodically shift the time image, the weather image, etc. displayed in the display area in the AOD mode.

For example, the display device 100 may periodically shift the time image, the weather image, etc. from the first display area DA1 to a second display area DA2 in the AOD mode (or from the second display area DA2 to the first display area DA1 or to another display area). In this case, the image position control signal generator 112 may generate the image position control signal IPCS for updating the position information of the image at each period to shift the time image, the weather image, etc. in the AOD mode within the display area of the display panel DP. Accordingly, the image position change component 123 generates the image position change signal IPVS in response to the image position control signal IPCS at each period in which the time image, the weather image, etc. are shifted in the AOD mode. The position information included in the deserialized input image data IDATA' stored in the frame memory FM may be updated according to the image position change signal IPVS, and the time image, the weather image, etc. may be shifted in the display area of the display panel DP in the AOD mode, for example, from the first display area DA1 to the second display area DA2. In the AOD mode, the host processor 110 may not generate the input image data IDATA, and the output interface 111 may not output input the image data IDATA.

Meanwhile, in the AOD mode, to update information about the time image, the weather image, etc., the host processor 110 may provide the display driver 120 with the input image data IDATA corresponding to the time image and/or the weather image including the updated information at a time interval of a preset period.

However, it is understood that the operation described with reference to FIG. 2A is not limited thereto, and in accordance with an embodiment, the image position control signal generator 112 may generate the image position control signal IPCS when there is a need to shift, rotate, and/or scale the image displayed in the display area of the display panel DP in the AOD mode, or the still image mode. It is understood that the AOD mode may be triggered in the still image mode, or independently from the still image mode. For example, the time image, the weather image, etc. may be displayed as being shifted in the AOD mode while in the moving image mode. While the time image, the weather image, etc. may be displayed in the AOD mode, the moving image may be displayed as being blurred in the background of the display area of the display panel DP at the time interval of the still image mode, reducing the power consumption in a manner similar to the still image mode.

Referring to FIGS. 1 and 2B, the display device 100 may rotate (or shift) an image displayed in the display area of the display panel DP at an angle of 90° depending on the horizontal mode or the vertical mode. To rotate the image displayed in the display area, the image position control signal generator 112 may generate the image position control signal IPCS for controlling the position and/or scale of the image so that the image is properly displayed in the display area. Accordingly, the image position change component 123 may generate the image position change signal IPVS in response to the image position control signal IPCS, so that the position information included in the deserialized input image data IDATA' stored in the frame memory FM may be updated accordingly, and the image displayed in the display area may be properly rotated (or shifted and/or scaled). The host processor 110 may not generate the input image data IDATA, and the output interface 111 may not output input image data IDATA while the image is being rotated.

Meanwhile, since the image displayed in the display area of the display panel DP is shifted (or rotated), the dimension (or size) of the image may be changed. In this case, the image position control signal generator 112 may generate the image position control signal IPCS including the size change information of the image. Accordingly, the deserialized input image data IDATA' stored in the frame memory FM may be updated including not only the position information but also the size change information of the image displayed in the display area may be changed.

Figure 2C:
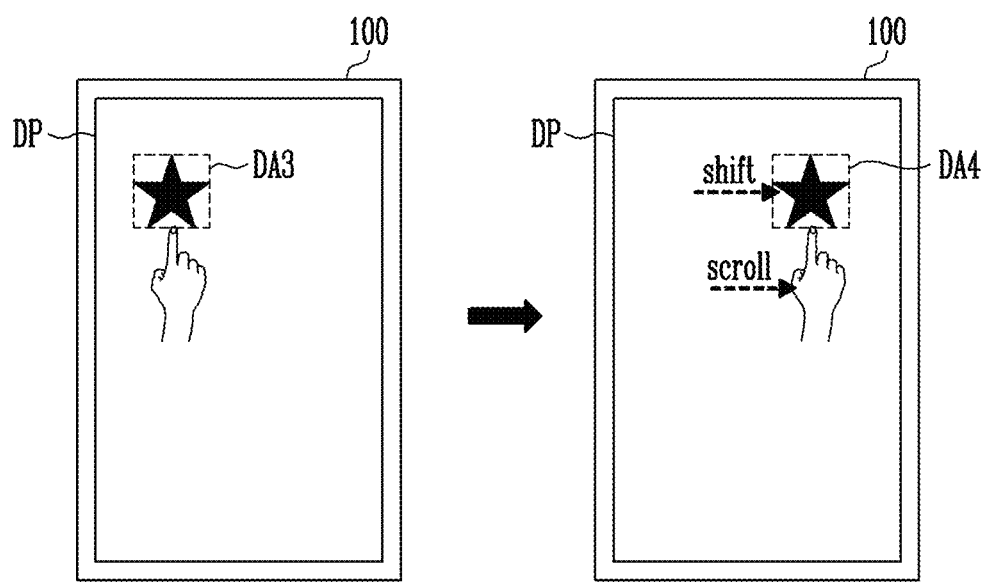

Further, referring to FIGS. 1 and 2C, the display device 100 may shift an image displayed in the display area of the display panel DP based on scroll information of the user in the still image mode. For example, when the user scrolls the image displayed in the display area from a third display area DA3 to a fourth display area DA4 in the still image mode, the display device 100 may shift the image displayed in the display area of the display panel DP to the third display area DA3 to the fourth display area DA4 in a scroll direction. In this case, the host processor 110 may receive touch information from a touch sensor (not illustrated) of the display device 100, and may generate the user's scroll information. To shift the image displayed in the display area based on the user's scroll information, the image position control signal generator 112 may generate the image position control signal IPCS for controlling the position information of the image in the display area based on the user's scroll information. Accordingly, the image position change component 123 may generate the image position change signal IPVS in response to the image position control signal IPCS, so that the position information included in the deserialized input image data IDATA' stored in the frame memory FM may be updated accordingly, and the image displayed in the display area may be shifted depending on the scroll direction, in the present example, from the third display area DA3 to the fourth display area DA4. While the image is being shifted in the scroll direction, the host processor 110 may not generate input image data IDATA, and the output interface 111 may not output input image data IDATA.

Referring to FIGS. 1 and 2D, the display device 100 may shift an image in the still image mode to display the image in a visible area perceivable by a user (and/or an invisible area that is not perceivable by the user) within the display area depending on a usage state of the display device 100.

For example, in a case where the display device 100 is an out-foldable display, an area perceivable by the user may be changed when the display device 100 is out-folded. Depending on an out-folded state, the display device 100 may display an image in a fifth display area DA5 or a sixth display area DA6. When the visible area perceivable by the user changes from the fifth display area DA5 to the sixth display area DA6, the display device 100 may shift the image displayed in the display area of the display panel DP from the fifth display area DA5 to the sixth display area DA6. In this case, to shift the image displayed in the display area based on the visible area (or invisible area) perceivable by the user, the image position control signal generator 112 may generate the image position control signal IPCS for controlling the position of the image to update the position information of the image and shift the image depending on the visible area. The image position change component 123 may generate the image position change signal IPVS in response to the image position control signal IPCS, the position information included in the deserialized input image data IDATA' stored in the frame memory FM may be updated accordingly, and the image displayed in the display area may be shifted from the fifth display area DA5 to the sixth display area DA6 depending on the visible area of the user. In this case, the host processor 110 may not generate the input image data IDATA, and the output interface 111 may not output the input image data IDATA. Meanwhile, to reduce power consumption, the display device 100 may display a black image in the invisible area that is not perceivable by the user, or may turn off power corresponding to the invisible area.

When a visible area perceivable by the user in the display area is changed depending on the usage state of the display device 100 by the user in the still image mode, the display device 100 may shift the image by updating the position information included in the deserialized input image data IDATA' to display the image in the visible area corresponding to the usage state. Although FIG. 2D shows an example of the out-foldable display device, the present disclosure is not limited thereto. For example, the display device 100 may be an in-foldable display device, a rollable display device, a bendable display device, or any other display device that the visible area can change depending on a usage state.

When the display device 100 does not shift the image displayed in the display area, the image position control signal generator 112 may not generate the image position control signal IPCS, so that the position information included in the deserialized input image data IDATA' is maintained.

In an embodiment, as described above with reference to FIG. 1, the memory controller 122 may change information regarding a start line and an end line of the image in the display area of the display panel DP in response to the image position change signal IPVS in the still image mode, and may update the position information included in the deserialized input image data IDATA' that is stored in the frame memory FM.

Referring to FIGS. 1 and 2E, an image is displayed in a seventh display area DA7 in accordance with an area ranging from a first line LINE1 to an n-th line LINEn, and the image is displayed in an eighth display area DA8 in accordance with an area ranging from an (n+1)-th line LINEn+1 to a 2n-th line LINE2$n$. Here, the first, n-th, (n+1)-th, and 2n-th lines LINE1, LINEn, LINEn+1, and LINE2$n$ may correspond to scan lines or data lines of the display panel DP.

When the image displayed in the seventh display area DA7 is shifted to the eighth display area DA8 in the still image mode, the image position control signal generator 112 may generate the image position control signal IPCS for controlling the position of the image to update the position information of the image and shift the image. Here, the image position control signal IPCS may include information regarding a start line and an end line of the image displayed in the display area. The image position change component 123 may generate the image position change signal IPVS in response to the image position control signal IPCS. The memory controller 122 may change the start line of the image displayed in the display area of the display panel DP from the first line LINE1 to the (n+1)-th line LINEn+1 and change the end line from the n-th line LINEn to the 2n-th line LINE2$n$ in response to the image position change signal IPVS. Accordingly, a portion the position information included in the deserialized input image data IDATA' stored in the frame memory FM may be updated accordingly, and the image displayed in the display area may be shifted from the seventh display area DA7 to the eighth display area DA8. In this case, the host processor 110 may not generate the input image data IDATA, and the output interface 111 may not output the input image data IDATA.

In an embodiment, as described above with reference to FIG. 1, the host processor 110 may provide the display driver 120 with the input image data IDATA corresponding to a partial area within the display area of the display panel DP and the image position control signal IPCS including the position information of the input image data IDATA corresponding to the partial area. The display driver 120 may update a portion of the deserialized input image data IDATA' corresponding to the partial area based on the input image data IDATA corresponding to the partial area and the image position control signal IPCS.

Referring to FIGS. 2E and 2F, the display device 100, the display panel DP, the seventh display area DA7, and the eighth display area DA8 are substantially identical or similar to each other, and repeated descriptions thereof will be omitted.

Referring to FIGS. 1 and 2F, to change the image displayed in a partial area within the display area of the display panel DP in the still image mode, the host processor 110 may generate the input image data IDATA (or the third sub-input image data) corresponding to the partial area, and the image position control signal generator 112 may generate the image position control signal IPCS including the position information of the input image data IDATA corresponding to the partial area. Here, the image position control signal IPCS may include information regarding the start lines and end lines of the images displayed in the partial area.

The input interface 121 may convert the serialized input image data IDATA corresponding to the partial area and may provide the converted deserialized input image data IDATA' to the memory controller 122. Also, the image position change component 123 may generate the image position change signal IPVS in response to the image position control signal IPCS, and may provide the image position change signal IPVS to the memory controller 122. Here, the image position change signal IPVS may include the position information of the input image data IDATA corresponding to the partial area.

The memory controller 122 may update a portion of the deserialized input image data IDATA' corresponding to an area CDA1 from the first line LINE1 to the i-th line LINEi, an area CDA2 from a j-th line LINEj to the n-th line LINEn, and an area CDA3 from a k-th line LINEk to the 2n-th line LINE2n based on the deserialized input image data IDATA' corresponding to the partial area and the image position change signal IPVS. Accordingly, the image displayed in the areas CDA1, CDA2, and/or CDA3 in the display area may be changed.

Figure 3:
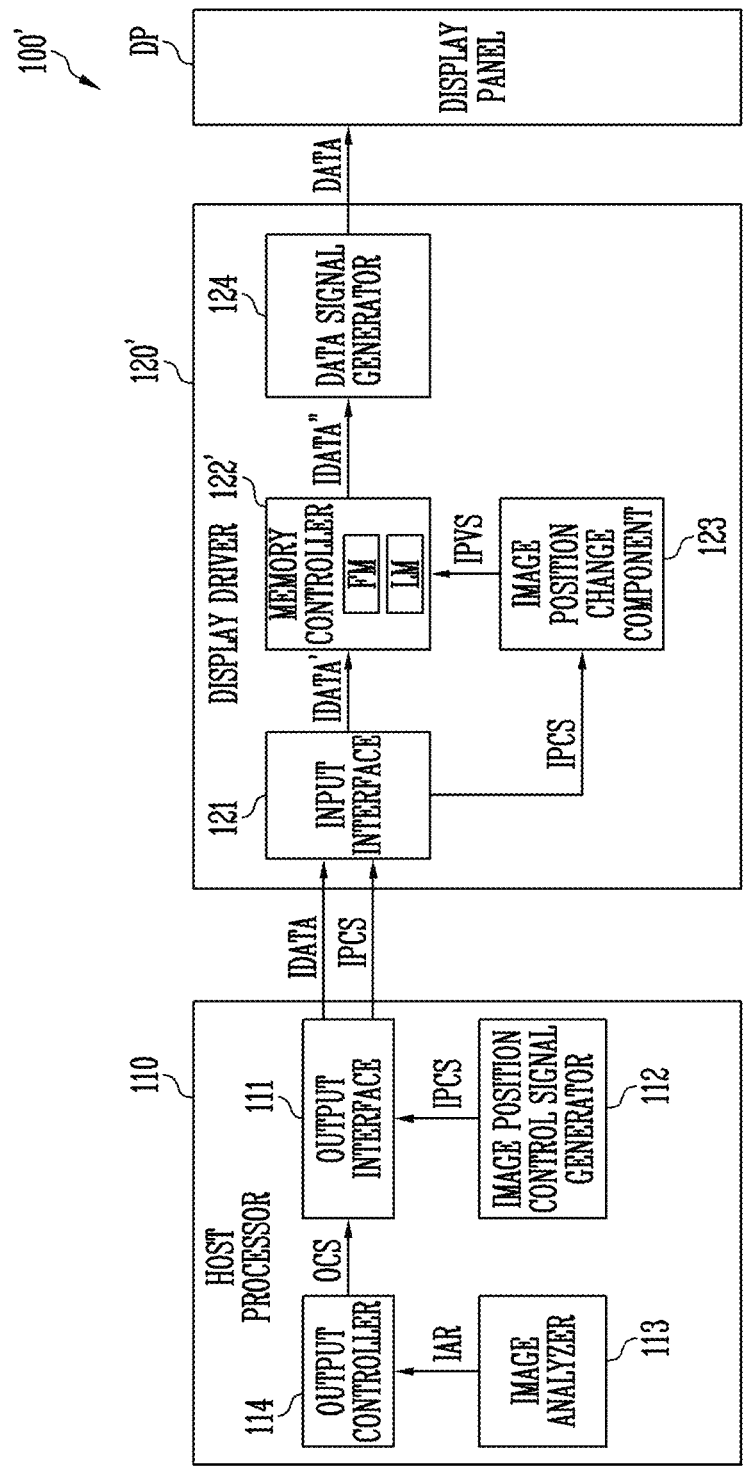
FIG. 3 is a diagram of a display device according to an embodiment of the present disclosure.
Figure 4A:
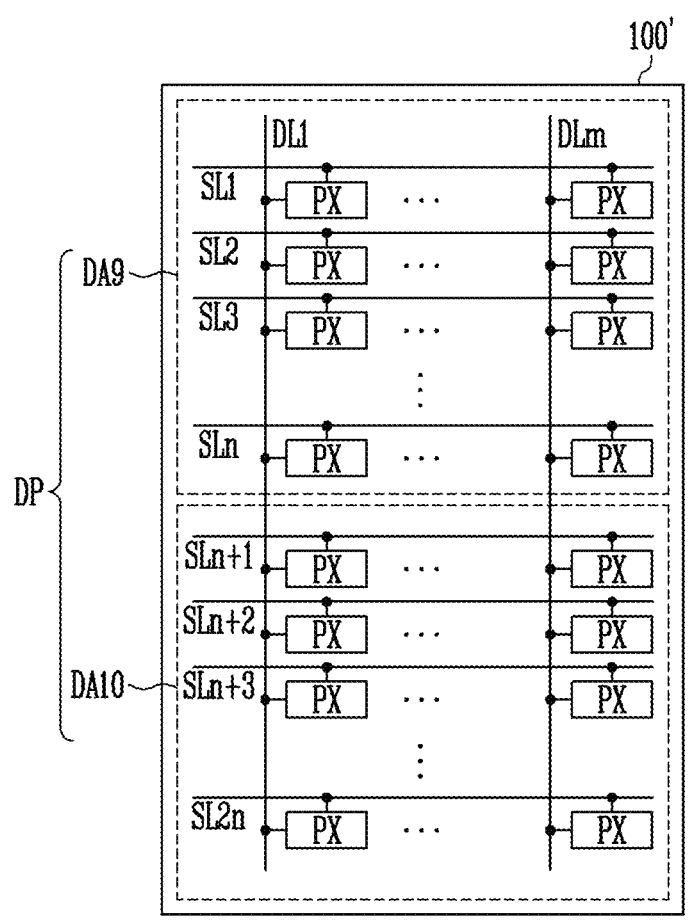
FIG. 4A and FIG. 4B are diagrams illustrating a display panel included in the display device of FIG. 3.
Figure 4B:
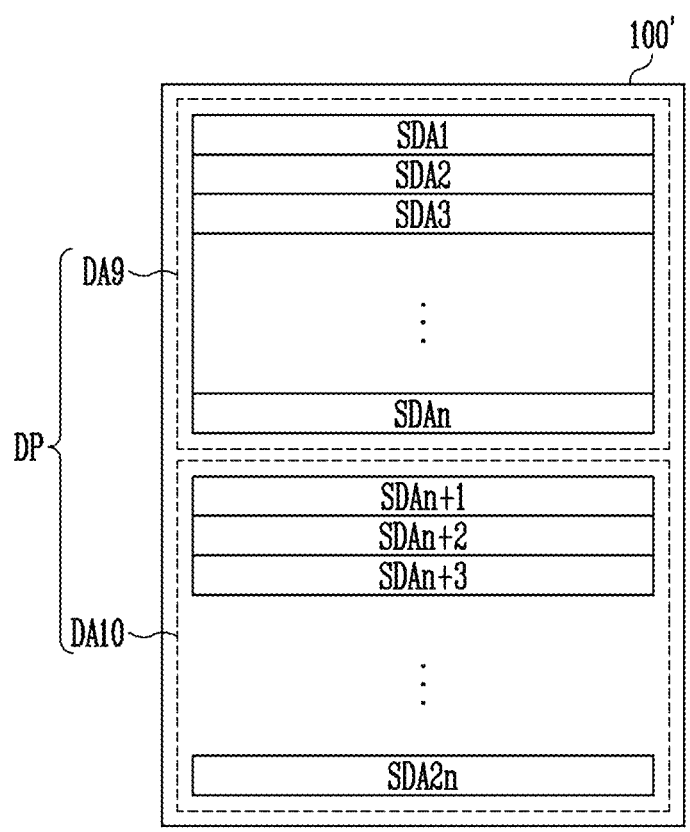
Figure 5A:
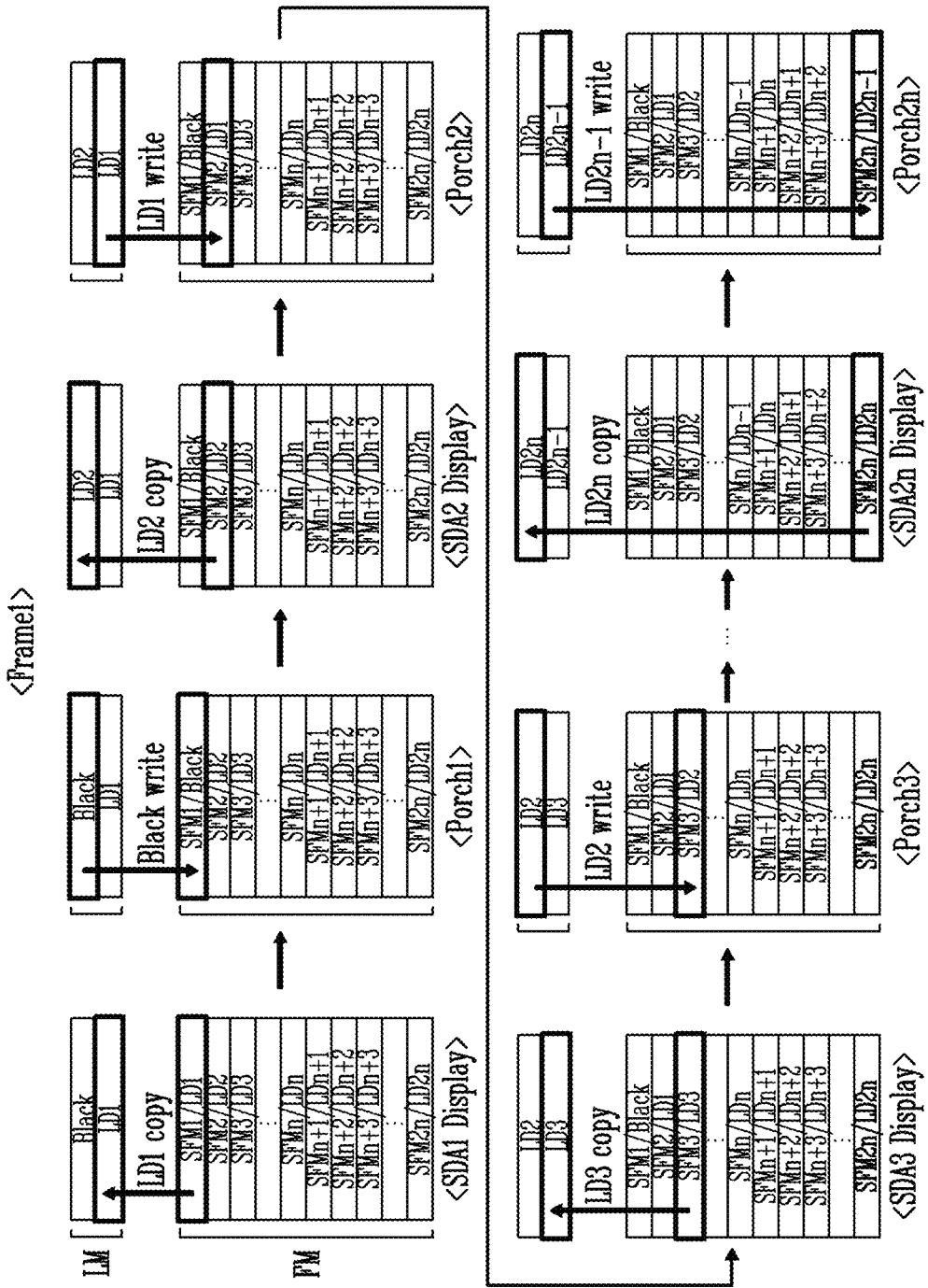
FIG. 5A is a diagram illustrating an example of operating a frame memory and a line memory included in the display device of FIG. 3.

FIG. 3 is a diagram of a display device according to an embodiment of the present disclosure, FIGS. 4A and 4B are diagrams illustrating a display panel included in the display device of FIG. 3, FIG. 5A is a diagram illustrating an example of operating a frame memory and a line memory included in the display device of FIG. 3, and FIG. 5B is a diagram illustrating an example in which an image displayed in the display area of the display panel of FIG. 4B is shifted according to the operation of the display device described with reference to FIG. 5A.

Referring to FIG. 3, a display device 100' may include the display panel DP, the host processor 110, and a display driver 120'.

Referring to FIGS. 1 and 3, the display panel DP and the host processor 110 are identical or similar to each other, except a memory controller 122' included in the display driver 120' of the display device 100' further includes a line memory LM in addition to the input interface 121, the image position change component 123, and the data signal generator 124, and repeated descriptions thereof will be omitted.

Referring to FIGS. 3 to 5A, the memory controller 122' may include the frame memory FM and the line memory LM.

In an embodiment, the display area included in the display panel DP may include first to 2n-th (where n is a natural number) sub-display areas (e.g., SDA1 to SDA2n of FIG. 4B). Here, the first to 2n-th sub-display areas may correspond to areas in which pixels PX respectively are coupled to scan lines SL1 to SL2n of the display panel DP as illustrated in FIG. 4A. For example, the first sub-display area SDA1 may correspond to an area in which the first scan line SL1 of the display panel DP is arranged, and the second sub-display area SDA2 may correspond to an area in which the second scan line SL2 of the display panel DP is arranged. However, the arrangement of the sub-display areas is not limited thereto, and the first to 2n-th sub-display areas (e.g., SDA1 to SDA2n of FIG. 4B) may correspond to areas in which pixels PX respectively are coupled to data lines DL1 to DLm of the display panel DP as illustrated in FIG. 4A.

Meanwhile, the first to n-th sub-display areas (e.g., SDA1 to SDAn of FIG. 4B) may correspond to a ninth display area (e.g., DA9 of FIG. 4B) of the display panel DP. The (n+1)-th to 2n-th sub-display areas (e.g., SDAn+1 to SDA2n of FIG. 4B) may correspond to a tenth display area (e.g., DA10 of FIG. 4B) of the display panel DP.

In an embodiment, the deserialized input image data IDATA' corresponding to a still image, may be stored in the frame memory FM including first to 2n-th line data values LD1 to LD2n.

In an embodiment, the frame memory FM may include first to 2n-th sub-frame memories SFM1 to SFM2n that store the first to 2n-th line data values LD1 to LD2n, respectively, during a current frame period (e.g., a first frame period Frame1). Here, the first to 2n-th line data values LD1 to LD2n stored in the first to 2n-th sub-frame memories SFM1 to SFM2n may correspond to respective data values of images to be displayed in the first to n-th sub-display areas (e.g., SDA1 to SDAn of FIG. 4B), or the ninth display area DA9, during the current frame period (e.g., the first frame period Frame1).

The line memory LM may include two memories (or memory blocks), and may store at least some of the data values included in the deserialized input image data IDATA' (or the second sub-input image data) stored in the frame memory FM.

In an embodiment, the line memory LM may store an i-th line data value and an (i+1)-th line data value (where i is a natural number that is equal to or greater than 1 and is less than or equal to n), among the first to 2n-th line data values LD1 to LD2n, in response to the image position change signal IPVS received from the image position change component 123 in the still image mode. The frame memory FM may store the i-th line data value stored in the line memory LM as a line data value corresponding to an (i+1)-th sub-display area, among the first to 2n-th sub-display areas SDA1 to SDA2n, and may store the (i+1)-th line data value stored in the line memory LM as a line data value corresponding to an (i+2)-th sub-display area, among the first to 2n-th sub-display areas SDA1 to SDA2n, in response to the image position change signal IPVS received from the image position change component 123 in the still image mode.

For example, referring to FIGS. 3 to 5A, during the first frame period Frame1 in the still image mode, the data signal generator 124 may generate the data signals DATA for displaying an image in the first sub-display area (e.g., SDA1 of FIG. 4B or an area in which the first scan line SL1 is arranged) based on the first line data value LD1 stored in the frame memory FM, and may provide the data signals DATA to the display panel DP, and the display panel DP may display the image in the first sub-display area (e.g., SDA1 of FIG. 4B) based on the data signals DATA corresponding to the first line data value LD1. In this case, in response to the image position change signal IPVS, the line memory LM may copy the first line data value LD1 stored in the frame memory FM, during a SDA1 Display period in which the image is displayed in the first sub-display area (e.g., SDA1 of FIG. 4B). This process is referred to as an LD1 copy process.

After the image is displayed in the first sub-display area (e.g., SDA1 of FIG. 4B), the frame memory FM may write a line data value corresponding to a black grayscale stored in the line memory LM, as a line data value corresponding to the first sub-display area (e.g., SDA1 of FIG. 4B), in a first sub-frame memory SFM1 during a first porch period Porch1 (or a first blank period). This process is referred to as a Black write process.

The data value that is stored by the frame memory FM in the first sub-frame memory SFM1 as a line data value corresponding to the first sub-display area (e.g., SDA1 of FIG. 4B) may not be limited to the line data value corresponding to the black grayscale. For example, the data value, that is stored by the frame memory FM in the first sub-frame memory SFM1 as the line data value corresponding to the first sub-display area (e.g., SDA1 of FIG. 4B) may be a line data value corresponding to a white grayscale.

Meanwhile, the data signal generator 124 may generate the data signals DATA for displaying an image in a second sub-display area (e.g., SDA2 of FIG. 4B or an area in which the second scan line SL2 is arranged) based on the second line data value LD2 stored in the frame memory FM, and may provide the data signals DATA to the display panel DP, and the display panel DP may display the image in the second sub-display area (e.g., SDA2 of FIG. 4B) based on the data signals DATA corresponding to the second line data value LD2. In this case, in response to the image position change signal IPVS, the line memory LM may copy the second line data value LD2 stored in the frame memory FM, during a SDA2 Display period in which the image is displayed in the second sub-display area (e.g., SDA2 of FIG. 4B). This process is referred to as an LD2 copy process.

After the image is displayed in the second sub-display area (e.g., SDA2 of FIG. 4B), the frame memory FM may write the first line data value LD1 stored in the line memory LM, as a line data value corresponding to the second sub-display area (e.g., SDA2 of FIG. 4B), in a second sub-frame memory SFM2 during a second porch period Porch2 (or a second blank period). This process is referred to as an LD1 write process. Accordingly, during the first frame period Frame1, the first line data value LD1 stored in the first sub-frame memory SFM1 corresponding to the first sub-display area (e.g., SDA1 of FIG. 4B) may be shifted to and stored in the second sub-frame memory SFM2 corresponding to the second sub-display area (e.g., SDA2 of FIG. 4B). Thereafter, in a similar way, second to 2n-1-th line data values LD2 to LD2n-1 stored in the second to 2n-1-th sub-frame memories SFM1 to SFM2n-1 respectively corresponding to the second to the 2n-1-th sub-display areas (e.g., SDA2 to SDA2n-1 of FIG. 4) may be shifted to and stored in third to 2n-th sub-frame memories SFM3 to SFM2n respectively corresponding to the third to 2n-th sub-display areas SDA3 to SDA2n.

Accordingly, in the still image mode, the position information of the line data values included in the deserialized input image data IDATA' that is stored in the frame memory FM may be updated during one frame period (e.g., during the first frame period Frame1) in response to the image position change signal IPVS.

Thereafter, in a way substantially similar to that of the first frame period Frame1, a portion of the position information of the line data values included in the deserialized input image data IDATA' that is stored in the frame memory FM may be updated during a plurality of frame periods (e.g., second to 2n-th frame periods).

As described above with reference to FIGS. 3 to 5B, when the display device 100 shifts an image displayed in the display area of the display panel DP from the ninth display area DA9 to the tenth display area DA10 in the still image mode, the image position control signal generator 112 may generate the image position control signal IPCS for controlling the position of the image to update the position information of the image and shift the image. The image position change component 123 may generate the image position change signal IPVS in response to the image position control signal IPCS, and may update a portion of the position information of the line data values included in the deserialized input image data IDATA' stored in the frame memory FM in response to the image position change signal IPVS during the first to 2n-th frame periods Frame1, Frame2, . . . , Frame2n. Referring to FIG. 5B, the image displayed in the display area may be shifted from the ninth display area DA9 to the tenth display area DA10 in a plurality of frames including the first to 2n-th frame periods Frame1, Frame2, . . . , Frame2n.

Meanwhile, shifting the line data values LD1 to LD2n stored in the frame memory FM during one frame period is not limited to shifting in one sub-frame memory. For example, the line memory LM may include four or more memories (e.g., four or eight memories), and line data values LD1 to LD2n that are stored in the frame memory FM during one frame period may be shifted and stored in two or more sub-frame memories (e.g., two or four sub-frame memories). Accordingly, the time to shift a still image from the ninth display area DA9 to the tenth display area DA10 by sequentially shifting and storing the line data values LD1 to LD2n during one frame period may be reduced, and the image may be shifted faster compared to the examples described with reference to FIGS. 5A and 5B.

As described above with reference to FIGS. 3 to 5B, the display device 100 may shift and store the line data values LD1 to LD2n stored in the frame memory FM in one or more sub-frames using the line memory LM in the still image mode, and the position information of the line data values included in the deserialized input image data IDATA' stored in the frame memory FM may be updated accordingly. Accordingly, images may be naturally shifted over a plurality of frame periods.

It is understood that the line memory LM described above with reference to FIGS. 3 to 5B may be implemented in any of the image shifting examples described above with reference to FIGS. 2A to 2F.

Figure 6A:
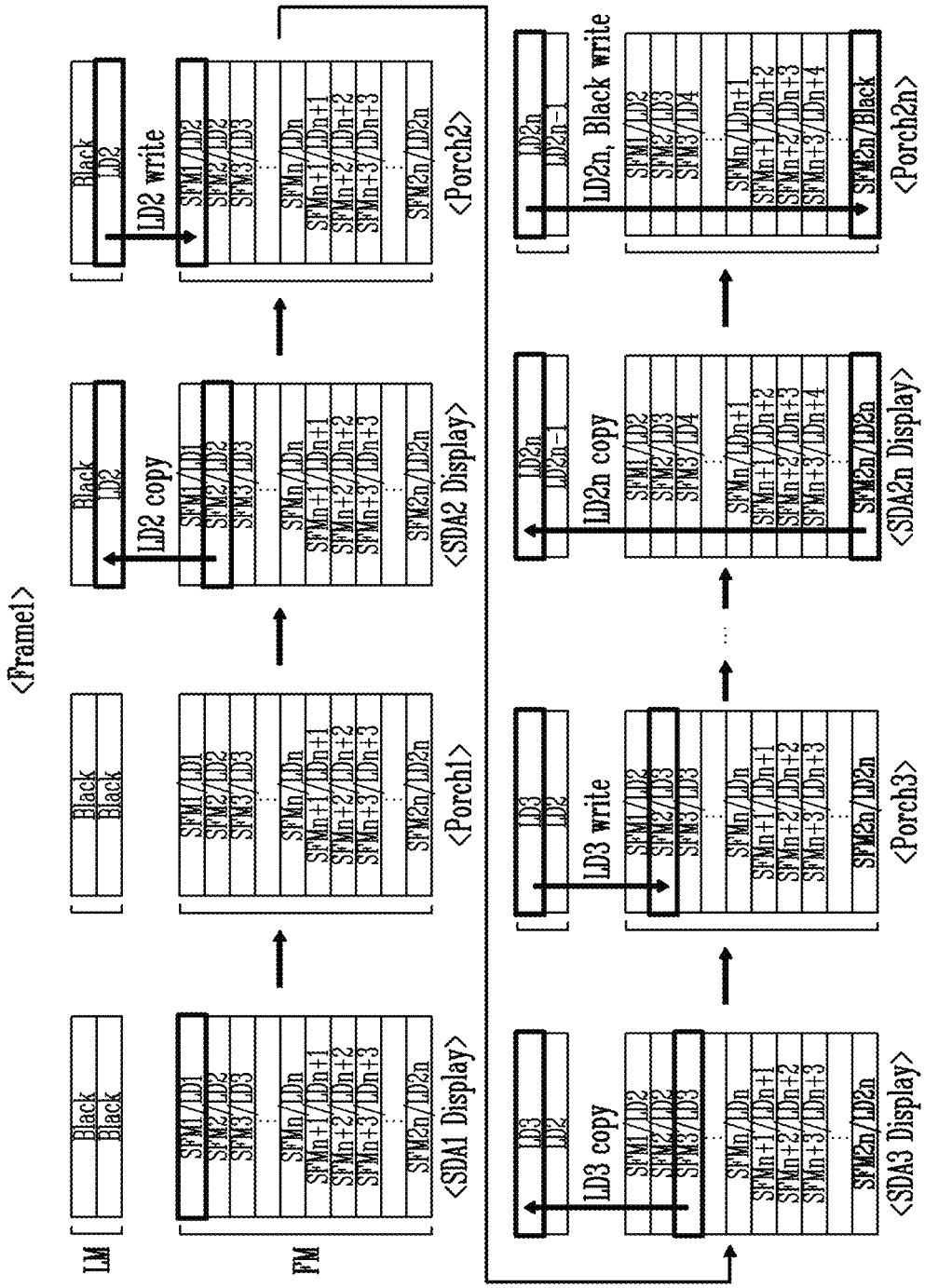
FIG. 6A is a diagram illustrating an example of operating the frame memory and the line memory included in the display device of FIG. 3.

FIG. 6A is a diagram illustrating an example of operating a frame memory and a line memory included in the display device of FIG. 3, and FIG. 6B is a diagram illustrating an example in which an image displayed in the display area of the display panel of FIG. 4B is shifted according to the operation of the display device described with reference to FIG. 6A.

The configurations of FIGS. 6A and 6B are substantially identical or similar to those described above with reference to FIGS. 5A and 5B, except that the image is shifted from the tenth display area DA10 to the ninth display area DA9 in FIGS. 6A and 6B, and repeated descriptions thereof will be omitted.

FIG. 7 is a flowchart of driving a display device according to an embodiment of the present disclosure.

Referring to FIGS. 1, 3, and 7, the flowchart of FIG. 7 may be applicable to the display device 100 of FIG. 1 or the display device 100' of FIG. 3.

The display device 100 or the display device 100' includes the host processor 110, the display driver 120 or the display driver 120', and the display panel DP.

The host processor 110 may generate input image data at step S710.

Here, the host processor 110 may include the output interface 111, the image position control signal generator 112, the image analyzer 113, and the output controller 114.

Thereafter, the display driver 120 of FIG. 1 or the display driver 120' of FIG. 3 may generate data signals based on the input image data at step S720.

Here, the display driver may include the input interface 121, the memory controller 122 or the memory controller 122', the image position change component 123, and the data signal generator 124. The memory controller 122 may include the frame memory FM, and the memory controller 122' may include the frame memory FM and the line memory LM.

Thereafter, in the driving method of FIG. 7, the display panel DP may display an image in a display area based on the data signals at step S730.

The display device according to the present disclosure may shift an image displayed in a display area by updating position information included in input image data that is stored in a frame memory, without generating input image data for shifting the image through the host processor in the still image mode. Accordingly, power consumption by the host processor to generate input image data and power consumption by an interface to transmit/receive the input image data may be reduced.

The foregoing detailed descriptions are merely examples of the present disclosure and intended to represent and describe exemplary embodiments of the present disclosure, and may be used in various combinations, modifications and environments. The inventive concept may be changed or modified without departing from the technical spirit and scope of the concept of the present disclosure, equivalents of the disclosure, and/or the technical idea or knowledge in the art. Therefore, the detailed description of the exemplary embodiments is not intended to limit the present disclosure. Also, the accompanying claims should be construed as including alternative embodiments.

What is claimed is:

1. A display device comprising:
a display driver comprising a memory controller, an image position change component, and a data signal generator, wherein the memory controller is configured to receive input image data that includes position information for an image and configured to receive an image position change signal from the image position change component for updating the position information for the image to generate updated image data, and wherein the data signal generator is configured to generate a data signal based on the updated image data; and
a display panel configured to display the image in a display area based on the data signal.

2. A display device comprising:
a display driver configured to receive input image data that includes position information for an image, configured to update the position information for the image to generate updated image data, and configured to generate a data signal based on the updated image data; and
a display panel configured to display the image in a display area based on the data signal,
wherein the display panel is drivable in a first mode in which a moving image is displayed in the display area and is drivable in a second mode in which a still image is displayed in the display area,
wherein the input image data includes first sub-input image data and second sub-input image data,
wherein, in the first mode, the first sub-input image data is provided to the display driver in each frame, and
wherein, in the second mode, the second sub-input image data is provided to the display driver for at least one frame, after which provision of the second sub-input image data is paused.

3. The display device according to claim 2,
wherein the display driver does not receive new input image data during a frame period in which the display driver updates the position information for the image.

4. The display device according to claim 1, wherein the display driver comprises:
an input interface configured to convert serialized data into the input image data and configured to provide an image position control signal to the image position change component, wherein the image position change component is configured to generate the image position change signal in response to the image position control signal.

5. A display device comprising:
a display driver comprising a memory controller, an image position change component, and a data signal generator, wherein the memory controller is configured to receive input image data that includes position information for an image and configured to receive an image position change signal from the image position change component for updating the position information for the image to generate updated image data, and wherein the data signal generator is configured to generate a data signal based on the updated image data; and
a display panel configured to display the image in a display area based on the data signal,
wherein the display device is a foldable display device,
wherein the display area includes a first display area visible to a user when the display device is in a folded state and a second display area visible to the user when the display device is an unfolded state, and
wherein when the display device is changed from the unfolded state to the folded state, the image displayed in the second display area is shifted to the first display area.

6. The display device according to claim 1,
wherein the display driver comprises a frame memory configured to store the input image data,
wherein the display area comprises first to n-th sub-display areas, where n is a natural number,
wherein the input image data includes first to n-th line data values respectively corresponding to the first to n-th sub-display areas, and wherein the display driver comprises a line memory configured to store at least a portion of the first to n-th line data values included in the input image data stored in the frame memory.

7. The display device according to claim 6,
wherein the line memory stores an i-th line data value and (i+1)-th line data value, among the first to n-th line data values, where i is a natural number that is equal to or greater than 1 and is less than or equal to n,
wherein the frame memory stores the i-th line data value stored in the line memory, as a first line data value corresponding to an (i+1)-th sub-display area, among the first to n-th sub-display areas, and stores the (i+1)-th line data value stored in the line memory, as a second line data value corresponding to an (i+2)-th sub-display area, among the first to n-th sub-display areas, and
wherein the image is shifted based on the first to n-th line data values stored in the frame memory during the frame period.

8. A display device comprising:
a host processor configured to generate input image data that includes position information for an image and configured to output an image position control signal;
a display driver configured to receive the input image data and the image position control signal from the host processor, configured to update the position information for the image to generate updated image data, and configured to generate a data signal based on the updated image data; and
a display panel configured to display the image in a display area based on the data signal,
wherein the display driver does not receive new input image data during a frame period in which the display driver updates the position information for the image.

9. The display device according to claim 8, wherein:
the display panel is drivable in a first mode in which a moving image is displayed in the display area and is drivable in a second mode in which a still image is displayed in the display area,
the input image data includes first sub-input image data corresponding to the first mode and second sub-input image data corresponding to the second mode,
an image position control signal generator configured to generate the image position control signal in the second mode; and
an output interface configured to output the first sub-input image data, the second sub-input image data, and the image position control signal.

10. The display device according to claim 8,
wherein the display driver further updates size information for the image for generating the updated image data.

11. The display device according to claim 8,
wherein the display device is a foldable display device,
wherein the display area includes a first display area visible to a user when the display device is in a folded state and a second display area visible to the user when the display device is an unfolded state, and
wherein when the display device is changed from the unfolded state to the folded state, the image displayed in the second display area is shifted to the first display area.

12. The display device according to claim 9, wherein the host processor further comprises:
an image analyzer configured to analyze whether the display mode is the first mode or the second mode; and
an output controller configured to generate an output control signal when the display mode is the second mode based on a result of analysis by the image analyzer.

13. The display device according to claim 12, wherein the output interface is configured to:
in the first mode, output the first sub-input image data as the input image data in each frame, and
in the second mode, output the second sub-input image data corresponding to at least one frame as the input image data in response to the output control signal, and pause to output the input image data based on the result of analysis.

14. The display device according to claim 9, wherein the display driver comprises:
an input interface configured to receive the first sub-input image data, the second sub-input image data, and the image position control signal;
a frame memory configured to store the second sub-input image data in the second mode; and
an image position change component configured to generate an image position change signal in response to the image position control signal in the second mode,
wherein the portion of the position information included in the second sub-input image data stored in the frame memory is updated in response to the image position change signal in the second mode.

15. The display device according to claim 14, wherein the display driver further comprises:
a data signal generator configured to generate the data signal in each frame based on the input image data.

16. The display device according to claim 15, wherein the data signal generator is configured to:
in the first mode, generate the data signal based on the first sub-input image data, and
in the second mode, generate the data signal based on the second sub-input image data stored in the frame memory.

17. The display device according to claim 8,
wherein the display panel comprises a visible area that is perceivable by a user and an invisible area that is not perceivable by the user in the display area, and
wherein the host processor generates the image position control signal based on the visible area.

18. The display device according to claim 8, wherein the host processor generates the image position control signal based on scroll information.

19. The display device according to claim 14,
wherein the display area comprises first to n-th sub-display areas, where n is a natural number,
wherein the second sub-input image data includes first to n-th line data values respectively corresponding to the first to n-th sub-display areas, and
wherein the display driver further comprises a line memory configured to store at least a portion of the first to n-th line data values included in the second sub-input image data stored in the frame memory.

20. The display device according to claim 19,
wherein the line memory stores an i-th line data value and (i+1)-th line data value, among the first to n-th line data values, in response to the image position change signal in the second mode, where i is a natural number that is equal to or greater than 1 and is less than or equal to n,
wherein the frame memory stores the i-th line data value stored in the line memory, as a first line data value corresponding to an (i+1)-th sub-display area, among the first to n-th sub-display areas, and stores the (i+1)-th line data value stored in the line memory, as a second line data value corresponding to an (i+2)-th sub-display area, among the first to n-th sub-display areas, in response to the image position change signal in the second mode, and wherein the image is shifted based on the first to n-th line data values stored in the frame memory in the second mode.

\* \* \* \* \*